(12) United States Patent
Li

(10) Patent No.: US 8,164,418 B2
(45) Date of Patent: Apr. 24, 2012

(54) AUTOMOBILE ANTI-THEFT REMOTE CONTROL DEVICE AND A CHARGER THEREFOR

(75) Inventor: Zhitao Li, Guangdong Province (CN)

(73) Assignee: Steel Mate Co., Ltd., Guangdong Province (CN)

( * ) Notice: Subject to any disclaimer, the term of this patent is extended or adjusted under 35 U.S.C. 154(b) by 926 days.

(21) Appl. No.: 12/189,209

(22) Filed: Aug. 11, 2008

(65) Prior Publication Data
US 2010/0033301 A1 Feb. 11, 2010

(51) Int. Cl.
*G05B 19/00* (2006.01)
(52) U.S. Cl. ...................................................... 340/5.72
(58) Field of Classification Search .............. 340/5.72, 340/5.6, 10.1, 546, 3.1; 307/10.2
See application file for complete search history.

(56) References Cited

U.S. PATENT DOCUMENTS

| 6,206,130 | B1 * | 3/2001 | Hetler | 180/287 |
| 2003/0001543 | A1 * | 1/2003 | Eisenbraun | 320/162 |

* cited by examiner

*Primary Examiner* — Vernal Brown

(57) ABSTRACT

An automobile anti-theft remote control device and a charger therefor in the field of automobile electronic anti-theft technology and more particularly pertains to a chargeable automobile anti-theft remote control device with a voice prompt function and a charger therefor. The chargeable battery is disposed in the anti-theft remote control device and its body has a charging socket. The remote control device comprises a voice prompt circuit, a vibration circuit and a display unit. The charger for the remote control device is disposed with a charging plug which is adapted to engage with the charging socket of the remote control device and to charge the chargeable battery in the remote control device. The power source input plug of the charger is adapted to engage with the car cigarette lighter socket for the power source input. The charger comprises a voltage detection circuit and a charging indication unit.

4 Claims, 4 Drawing Sheets

AUTOMOBILE ANTI-THEFT REMOTE CONTROL DEVICE AND A CHARGER THEREFOR

BACKGROUND OF THE INVENTION

The present invention relates to an automobile anti-theft remote control device and a charger therefor in the field of automobile electronic anti-theft technology and more particularly pertains to a chargeable automobile anti-theft remote control device with a voice prompt function and a charger therefor.

Automobiles are one means of transportation widely used by people and an automobile anti-theft device is an important accessory to an automobile. As the automobile anti-theft technology continuously improves and develops, and by analyzing from the perspectives of the existing market, users, cost effectiveness and so on, the two-way anti-theft system of an automobile will become an automobile anti-theft mainstream product. There exists a comparatively significant shortcoming in a two-way remote control device presently in use, that is, its power consumption is higher. The device often requires the replacement of new batteries after being used for less than a month or even a week. And, the discarded batteries also have to undergo proper treatments, or else the ecological environment will be affected. Thus, it causes inconvenience for a car owner to use the device and it increases a car owner's expenses on batteries. Specially made batteries of larger capacity may be used, and though the period for the replacement of batteries can slightly be extended, it inevitably increases the spending of a car owner.

Besides, as the automobile anti-theft device is increasingly popular, car owners' various requirements for the properties of anti-theft devices will be more and more demanding and more and more diverse. Many car owners also desire for an automobile anti-theft device with a voice prompt function to meet their requirements.

BRIEF SUMMARY OF THE INVENTION

In view of the aforesaid disadvantages now present in the prior art, the object of the present invention is to provide a chargeable automobile anti-theft remote control device with a voice prompt function which is convenient for use and alerts a car owner.

To attain this, the present invention adopts the following technical proposal:

An automobile anti-theft remote control device and a charger therefor, in which a chargeable battery is disposed inside the anti-theft remote control device and which is the power source for the remote control device, and a charging socket is disposed on the body of the remote control device and is adapted for engaging with a charger for charging the chargeable battery.

The remote control device comprises a processor control circuit, a display unit, an on/off switch circuit, a memory, a power source circuit, a high frequency amplification circuit, a transmission amplification circuit, a reception amplification circuit and an antenna.

The remote control device further comprises a voice prompt circuit formed by an audio frequency power amplification circuit; after the processor control circuit processes the input signal of the on/off switch circuit and the feedback signal of the reception amplification circuit, it sends out an audio frequency signal to the audio frequency power amplification circuit, and the audio frequency power amplification circuit sends out a sound prompt to indicate the state of the automobile.

The sound prompt generated by the voice prompt circuit which is formed by the audio frequency power amplification circuit is one of either a monotone, a chord, a melody or a voice, or a combination of any two kinds or three kinds thereof, or a concurrent output of the four kinds of sounds.

The remote control device further comprises a vibration circuit, the input end of the vibration circuit is connected with the output end of the processor control circuit, the vibration circuit can drive a vibration motor to cause the vibration of the remote control device.

The remote control device further comprises the display unit, the display unit is composed of a backlight panel and a display screen, the backlight panel has backlight lamps with at least two colors which in operation can light up multiple colors.

The charger for charging the remote control device comprises a charging plug which is adapted to engage with the charging socket of the remote control device and to charge the chargeable battery in the remote control device; and the charger is disposed with a power source input plug which is adapted to engage with a car cigarette lighter socket for the power source input.

The charger for charging the remote control device further comprises a power source input circuit, a CC/CV (constant-current/constant-voltage) circuit, a charging output circuit, a CC/CV (constant-current/constant-voltage) control circuit, a voltage detection circuit and a charging indication unit.

As a result of employing the technical proposal of the present invention, it is not required to replace the battery of the remote control when using a radio signal transmission anti-theft system. When the display screen of the remote control device indicates a low battery level, the device can directly be charged in an automobile, thereby achieving the objects of being convenient for use, facilitating saving in resources, and reducing the uses of primary batteries. Besides, the sound prompts of the remote control device are so diverse that users can have their personalized selections, thereby increasing the alertness. The display of the remote control device is so colorful that it is more appealing

Figure 1:
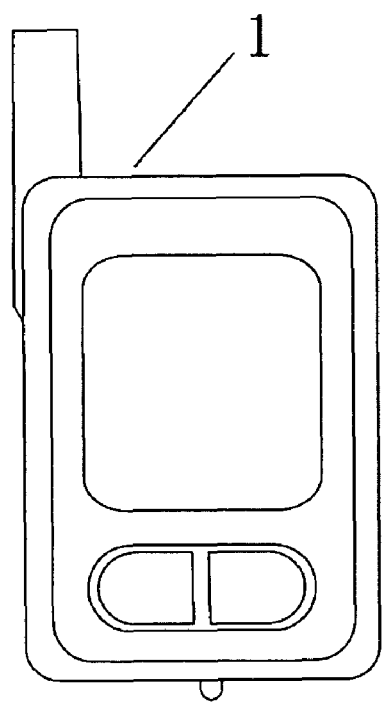
FIG. 1 is a perspective view showing the external appearance of the automobile anti-theft remote control device of the present invention.
Figure 2:
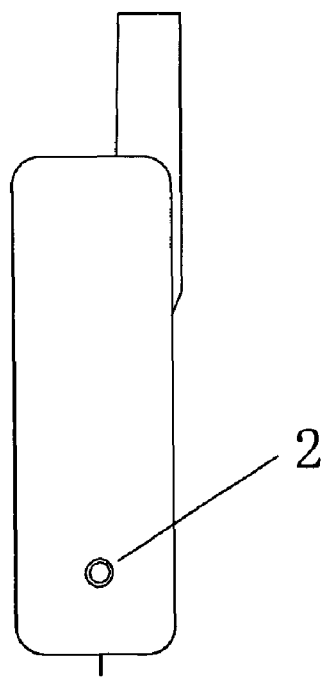
FIG. 2 is a side view of FIG. 1.

In the drawings, 1 is the anti-theft remote control device; 2 is the charging socket of the anti-theft remote control device; 3 is the charger for the remote control device of the present invention; 4 is the power source input plug of the charger for the remote control device; 5 is the charging output plug of the charger for the remote control device; and 7 is the indicator lamp of the charger for the remote control device.

Figure 3:
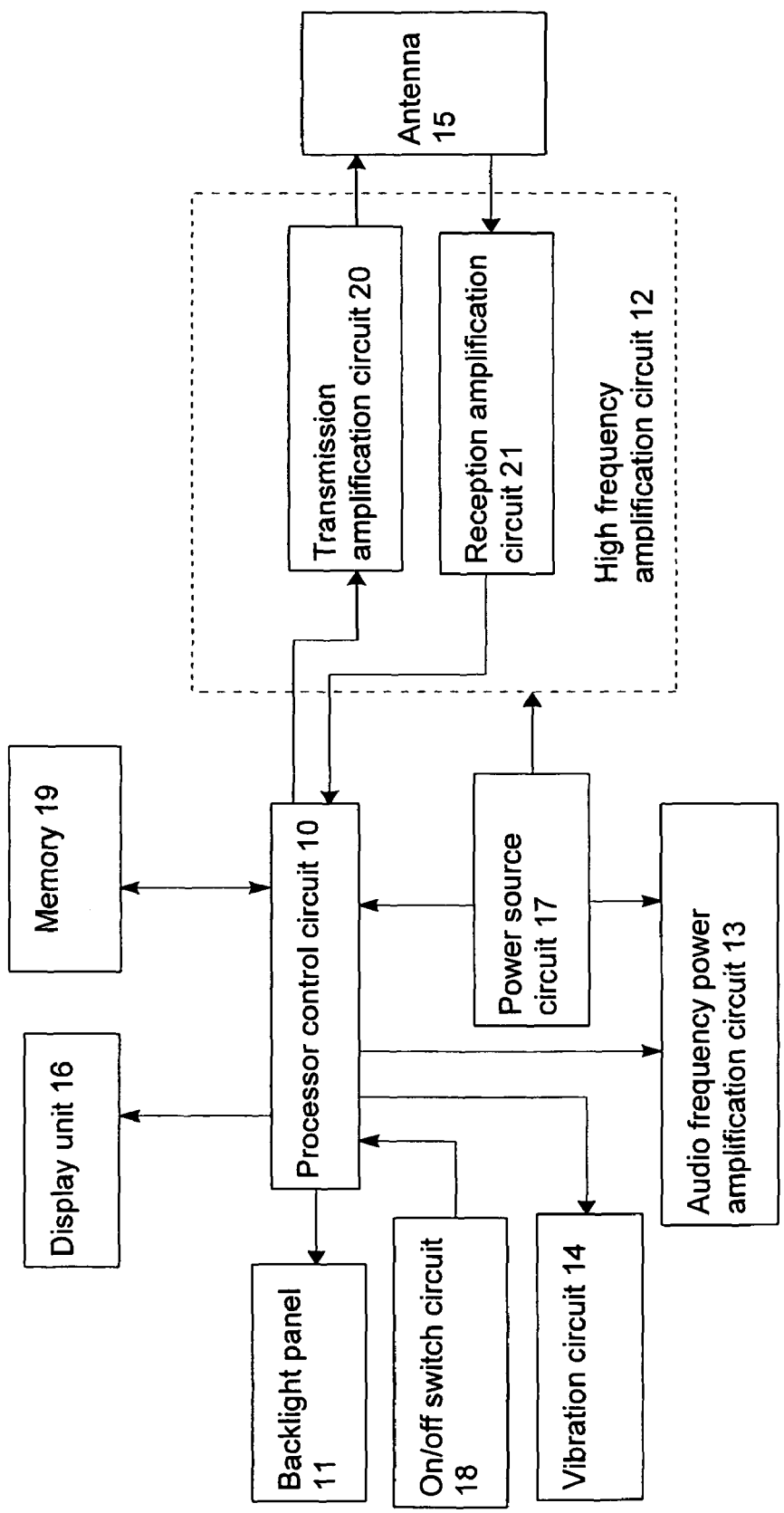
FIG. 3 is a block diagram of the internal electrical circuits of the automobile anti-theft remote control device of the present invention.
Figure 4:
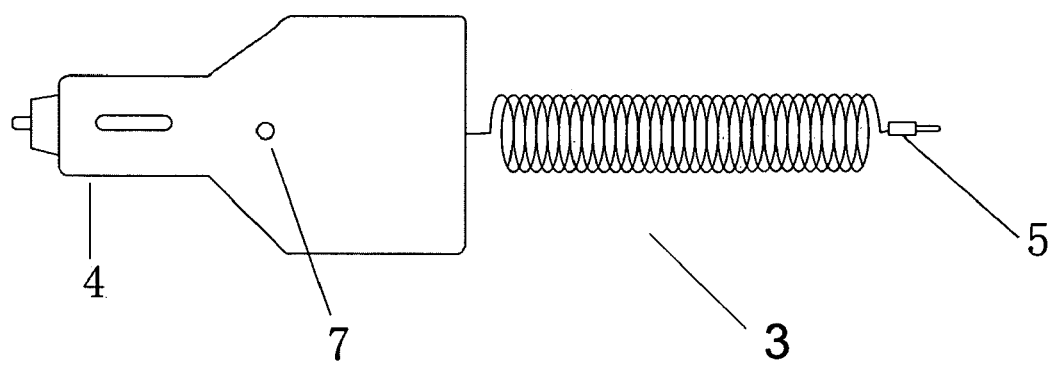
FIG. 4 is a perspective view showing the external appearance of the charger of the present invention.

In FIG. 3, 10 is the processor control circuit of the remote control device; 11 is the backlight panel of the remote control device; 12 is the high frequency amplification circuit of the remote control device which is formed by two parts, namely, the transmission amplification circuit 20 and the reception amplification circuit 21; 13 is the audio frequency power amplification circuit of the remote control device; 14 is the vibration circuit of the remote control device; 15 is the antenna of the remote control device; 16 is the display screen of the remote control device; 17 is the power source circuit of the remote control device; 18 is the on/off switch circuit of the remote control device; and 19 is the memory of the remote control device.

Figure 5:
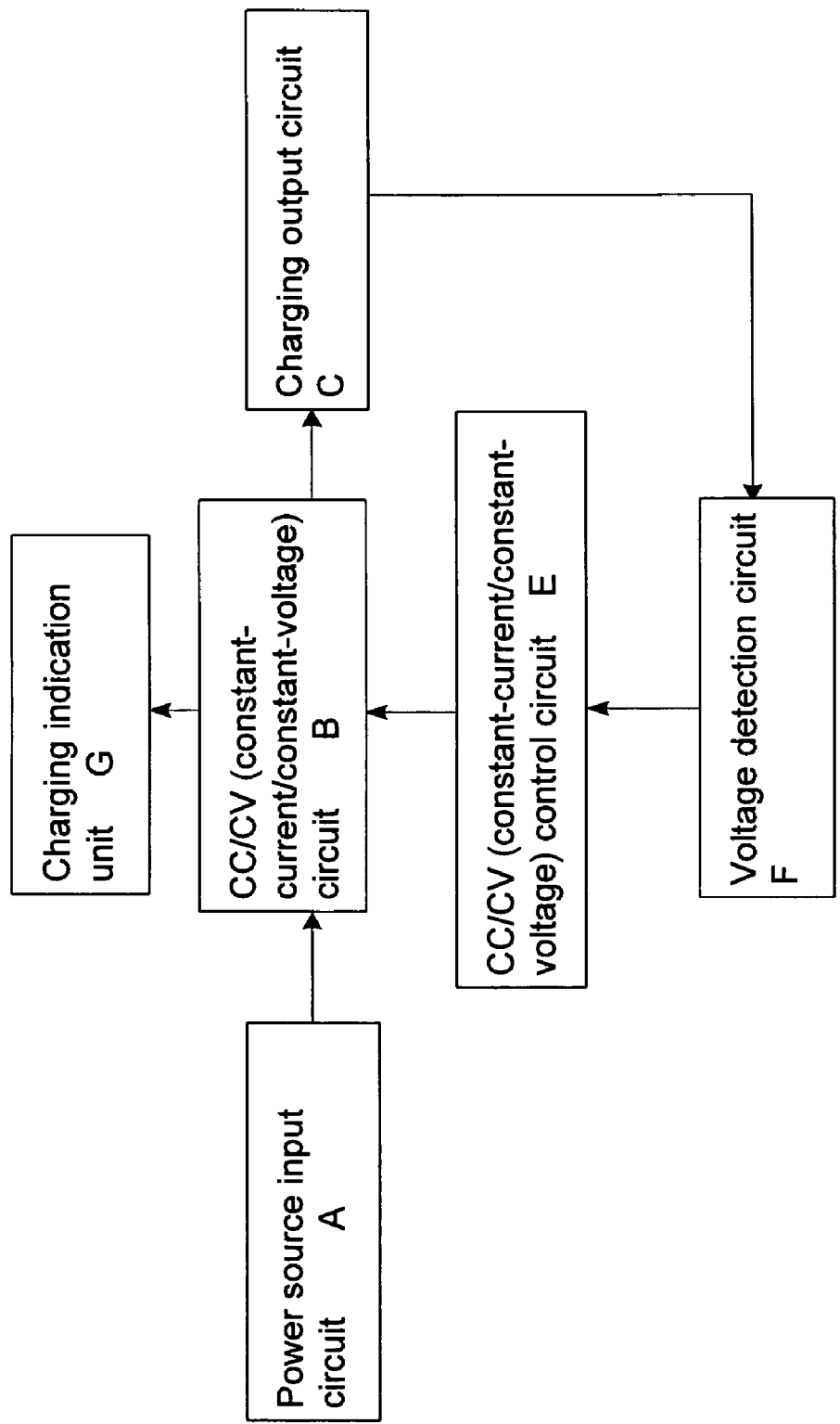
FIG. 5 is a block diagram of the internal electrical circuits of the charger of the present invention.

FIG. 5 shows the electrical circuits of the charger for the anti-theft remote control device, wherein A is the power source input circuit of the charger for the remote control device; B is the CC/CV (constant-current/constant-voltage) circuit B of the charger for the remote control device; C is the charging output circuit of the charger for the remote control device; E is the CC/CV (constant-current/constant-voltage) control circuit of the charger for the remote control device; F is the voltage detection circuit of the charger for the remote control device; and G is the charging indication unit of the charger for the remote control device.

DETAILED DESCRIPTION OF THE INVENTION

The preferred embodiment of the present invention is further described in detail with the following embodiment and the accompanying drawings.

As illustrated in FIGS. 1, 2, 4, and 5, the present invention comprises an anti-theft remote control device 1 and a charger 3 therefor. A chargeable battery is disposed inside the body of the anti-theft remote control device 1. The charging socket 2 for the battery of the remote control device is disposed on one side of the body of the anti-theft remote control device 1, or it may be disposed at the bottom of the body. As illustrated in FIG. 5, a power source input circuit A, a CC/CV (constant-current/constant-voltage) circuit B, a charging output circuit C, a CC/CV (constant-current/constant-voltage) control circuit E, a voltage detection circuit F, and a charging indication unit G are disposed inside the body of the charger 3.

A chargeable battery is disposed in the body of the anti-theft remote control device 1. The chargeable battery is the power source of the anti-theft remote control device 3. The body of the remote control device is disposed with a charging socket 2 for charging the chargeable battery. The remote control device 1 comprises a voice prompt circuit, a vibration circuit 14 and a display unit 16.

The charger 3 for the remote control device 1 is disposed with a charging plug 5 which is adapted to engage with the charging socket 2 of the remote control device 1, and is adapted for charging the chargeable battery in the remote control device 1. The power source input plug 4 of the charger 3 which is adapted to engage with a car cigarette lighter socket for the power source input.

While the present invention is in use and when the display screen 16 of the remote control device 1 indicates a low battery level, the power source input plug 4 of the charger 3 can be connected to the car cigarette lighter socket, the charging plug 5 is connected to the charging socket 2 of the anti-theft remote control device 1 for charging. During the charging process, the charging indicator lamp 7 is orange in color indicating that the charging is in process and the power capacity is not yet full; when the charging indicator lamp 7 turns green, it indicates that the charging is complete.

The operating process of the charging is: When the power source input plug 4 of the charger 3 is inserted into the car cigarette lighter socket, the power source of the car is connected with the power source input circuit A of the charger 3. If the automobile anti-theft remote control device 1 is not inserted, the charging indicator lamp 7 of the charger 3 is green. After the charging output plug 5 of the charger 3 and the automobile anti-theft remote control device 1 are connected, the voltage detection circuit F of the charger 3 starts to check the voltage of the chargeable battery which is connected with the charging output plug 5. If the voltage of the battery is detected being very low, the CC/CV (constant-current/constant-voltage) control then ensues, and by means of the CC/CV (constant-current/constant-voltage) circuit E to first carry out the constant-current charging. When the charge is nearly full and the voltage detection circuit F detects that the battery voltage will soon rise to a preset voltage, the CC/CV (constant-current/constant-voltage) control then ensues again and by means of the CC/CV (constant-current/constant-voltage) circuit E to carry out the constant-voltage charging until the charging is complete.

As illustrated in FIG. 3, the internal circuits of the remote control device 1 of the present invention comprise a processor control circuit 10, a backlight panel 11, a display screen 16, a vibration circuit 14, an audio frequency power amplification circuit 13, an on/off switch circuit 18, a memory 19, a power source circuit 17, a high frequency amplification circuit 12, a transmission amplification circuit 20, a reception amplification circuit 21 and an antenna 15. The output ends of the processor control circuit 10 are connected with the input ends of the backlight panel 11, the display screen 16, the vibration circuit 14 and the audio frequency power amplification circuit 13. The input ends of the processor control circuit 10 are connected with the output ends of the power source circuit 17 and the on/off switch circuit 18. The processor control circuit 10 is interconnected with the memory 19 and the high frequency amplification circuit 12. The output ends of the power source circuit 17 is connected with the input ends of the processor control circuit 10, the audio frequency power amplification circuit 13, and the high frequency amplification circuit 12. The high frequency amplification circuit 12 is composed of the transmission amplification circuit 20 and the reception amplification circuit 21 and by means of the antenna 15 to receive and transmit signals.

The operating process of the embodiment of the present invention is: When the on/off switch circuit 18 is selected to set the alarm on, and on reception of the signal the processor control circuit 10 starts verifying it with the code in the memory 19. After the signal is verified correct, the processor control circuit 10 sends it to the transmission amplification circuit 20 and the audio frequency power amplification circuit 13. The transmission amplification circuit 20 transmits the signal obtained by means of the antenna 15 for the host unit of the automobile anti-theft device to receive, and concurrently the remote control device 1 generates a monotone, a chord, a voice, or a melody indicating that the signal has already been sent. When the signal is successfully sent out, the automobile starts the locking action, after which the locking and anti-theft arming signal is reverted to the remote control device 1. The remote control device 1 also receives the signal by means of the antenna 15 for the reception amplification circuit 21 to amplify and then sends it to the processor control circuit 10 for processing, through which the processed signal is sent to the display screen 16, the backlight panel 11, and the audio frequency power amplification circuit 13, and at this time, the backlight panel 11 starts alternately sends out different colors of light, the locked sign on the display screen 16 flashes, the remote control device 1 generates a monotone, a chord, a voice, or a melody indicating the reverted signal from the automobile anti-theft host unit is received.

When the car door is opened, or the brake pedal is stepped on, or the ACC (accelerator) is opened, or the automobile is hit by a shock at times that the automobile is armed in an anti-theft state, the automobile anti-theft device sends out the alarm, the automobile anti-theft host unit concurrently transmits the signal, the remote control device 1 receives the signal by means of the antenna 15 which then passes through the reception amplification circuit 21 for the processor control circuit 10 to process. After being processed by the processor control circuit 10, the signal is sent to the display screen 16, the backlight panel 11, the vibration circuit 14, and the audio frequency power amplification circuit 13, and at this time, the backlight panel 11 starts alternately sending out different colors of light; the car door sign, or the brake pedal sign, or the ACC (accelerator) sign or the shock sign on the display screen 16 starts flashing, the remote control device 1 starts vibrating and generating a continuous monotone, a chord, a voice, or a melody to alert the car owner.

When the on/off switch circuit 18 is selected to disarm the alarm, the processor control circuit 10 on receiving this signal starts verifying it with the code in the memory 19. After the signal is verified correct, the processor control circuit 10 sends it to the transmission amplification circuit 20 and the audio frequency power amplification circuit 13. The transmission amplification circuit 20 sends the signal obtained by means of the antenna 15 for the host unit of the automobile anti-theft device to receive. The remote control device 1 concurrently generates two monotones, or chords, or voices, or melodies to indicate that the signal has already been sent. After the signal is successfully sent out, the automobile starts the unlocking action, after which the unlocking and anti-theft disarming signal is reverted to the remote control device 1 by means of the antenna 15 for the reception amplification circuit 21 to amplify and then for the processor control circuit 10 to process, through which the processed signal is sent to the display screen 16, the backlight panel 11 and the audio frequency power amplification circuit 13, and at this time, the backlight panel 11 starts alternately sending out different colors of light, the unlocked sign on the display screen 16 flashes, the remote control device 1 generates two monotones, or chords, or voices, or melodies to indicate the reception of the reverted signal by the automobile anti-theft host unit.

By means of different modes of setting of the processor control circuit 10, the on/off switch circuit 18 can select the output sound of the audio frequency power amplification circuit 13. It can be a monotone, a chord, a melody or an authentic human voice.

The above embodiment is the preferred embodiment of the present invention. The present invention is capable of other embodiments and is not limited to the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. An automobile anti-theft remote control device comprising a chargeable battery which is disposed inside the anti-theft remote control device and is the power source for the remote control device; and charging socket which is disposed on the body of the remote control device and is adapted for engaging with a charger for charging the chargeable battery, wherein the remote control device comprises a processor control circuit, a display unit, an switch circuit, a memory, a power source circuit, a high frequency amplification circuit and an antenna; the high frequency amplification circuit is composed of a transmission amplification circuit and a reception amplification circuit; the remote control device further comprises a voice prompt circuit formed by an audio frequency power amplification circuit; after the processor control circuit processes the input signal of the on/off switch circuit and the feedback signal of the reception amplification circuit, it sends out an audio frequency signal to the audio frequency power amplification circuit, and the audio frequency power amplification circuit sends out a sound prompt to indicate the state of the automobile; the remote control device further comprises a vibration circuit, the input end of the vibration circuit is connected with the output end of the processor control circuit, the vibration circuit can drive a vibration motor to cause the vibration of the remote control device; the remote control device further comprises the display unit, the display unit is composed of a backlight panel and a display screen, the backlight panel has backlight lamps with at least two colors which in operation can light up multiple colors.

2. An automobile anti-theft remote control device as in claim 1, wherein the sound prompt generated by the voice prompt circuit which is formed by the audio frequency power amplification circuit is one of either a monotone, a chord, a melody or a voice, or a combination of any two kinds or three kinds thereof, or a concurrent output of the four kinds of sounds.

3. A charger for charging an automobile anti-theft remote control device as in claim 1 comprising a charging plug which is adapted to engage with the charging socket of the remote control device and to charge the chargeable battery in the remote control device; and the charger is disposed with a power source input plug which is adapted to engage with a car cigarette lighter socket for the power source input.

4. A charger for charging an automobile anti-theft remote control device as in claim 3, wherein the charger for the remote control device comprises a power source input circuit, a CC/CV (constant-current/constant-voltage) circuit, a charging output circuit, a CC/CV (constant-current/constant-voltage) control circuit, a voltage detection circuit and a charging indication unit.

\* \* \* \* \*